United States Patent [19]

Kinsey, Jr.

[11] Patent Number: 5,693,373
[45] Date of Patent: Dec. 2, 1997

[54] HEAT-SEALS FOR POLYOLEFINS

[75] Inventor: Joe L. Kinsey, Jr., Irvington, Ala.

[73] Assignee: International Paper Company, Tuxedo Park, N.Y.

[21] Appl. No.: 686,892

[22] Filed: Jul. 26, 1996

[51] Int. Cl.$^6$ ..................................................... C08F 2/54
[52] U.S. Cl. ........................ 427/496; 427/457; 427/487; 428/513; 522/150; 522/157; 522/158; 522/161
[58] Field of Search ...................................... 427/457, 487, 427/496, 351; 522/150, 157, 158, 161; 428/513

[56] References Cited

U.S. PATENT DOCUMENTS 2,919,473  1/1960  Cole .
2,936,261  5/1960  Cole .
2,936,271  5/1960  Rehner et al. .

*Primary Examiner*—George F. Lesmes
*Assistant Examiner*—Cheryl Juska
*Attorney, Agent, or Firm*—Michael J. Doyle; Stewart L. Gitler; Martin P. Hoffman

[57] ABSTRACT

A method of improving heat-seals for polyolefin polymers which are coated onto a paperboard substrate. The method obviates the need for use of a curable bonding agent. The materials are exposed to high energy radiation prior to formation of the heat seal to induce crosslinking of the poller and thereby increase the average molecular weight of same.

3 Claims, 8 Drawing Sheets

HEAT-SEALS FOR POLYOLEFINS

FIELD OF THE INVENTION

This invention relates to a method for improving the heat sealability of polymers, such as polyolefins during package formation, after the polyolefin have been processed into a film or extrusion coated onto a substrate.

BACKGROUND OF THE INVENTION

As heat sealing machinery speeds increase, the demands placed on the polymers being sealed are increased. Polymers must exhibit improved seal initiation temperatures and improved hot tack or green strength properties. In the case of low density polyolefins, such as low density polyethylene, improvement can be achieved by selecting materials of appropriate density and molecular weight.

Generally, lower density, higher molecular weight polyolefins such as polyethylene are selected for improved heat sealability. However, high molecular weight polymers have some negative manufacturing impacts. For extrusion, the use of high molecular weight polyolefins can limit process throughput and efficiency, particularly in high speed processing plants.

Balancing heat seal properties of polyethylene coated papers and paperboards with polyethylene extrusion coating characteristics is a difficult problem that has faced extrusion coaters for many years. While higher melt index polyethylenes have desirable extrusion coating properties, the higher melt index reduces the heat seal window. Thus the desirable polyethylene is one of low melt index for good heat seal properties, but has extrusion coating characteristics of high melt index. Achievement of this blend of properties has proven difficult, if not impossible.

While this blend of polymer properties does not appear achievable in polyethylene produced by currently available processes, other methods of accomplishing the combination of excellent extrusion coating characteristics and excellent heat sealability are possible with currently available processes.

One such method is electron beam (EB) treatment of extrusion coated papers and paperboard. Electron beam treatment on oligomeric inks is widely used today in the printing industry to form cross-linked coatings that have many attributes. In this case, the inks are so highly cross-linked that they are thermoset polymers, and therefore do not melt. However, polyethylene and other addition polymers may be controllably cross-linked using EB treatment to significantly alter the molecular weight of the polymer while maintaining thermoplastic behavior.

Some radiating techniques have been employed to impact polymer properties. For example, U.S. Pat. No. 2,919,473, issued Jan. 5, 1960, to Q. P. Cole, describes molding of polyethylene irradiated with high energy electrons. The method is purposed at rendering polymers infusible and insoluble prior to molding. The present invention improves fusability.

U.S. Pat. No. 2,936,261, issued May 10, 1960, to Q. P. Cole, describes sealing with polyethylene irradiated with a high energy radiation. A bonding agent is applied between the surfaces of the irradiated polyethylene desired to be sealed. The patent teaches away from employing conventional heat-sealing techniques, application of heat and pressure. The seal will not form without the curing agent.

U.S. Pat. No. 2,936,271, issued May 10, 1960, to J. Rehuer et al., describes irradiation of polymeric materials to reduce the molecular weight thereof. This concept conflicts with the present invention which addresses increasing the molecular weight of the material.

While significant work has been done to investigate the possibilities of radiation treatment of polymers, none has been as effective to improve the physical properties of the bulk polymer or, in the case of films, to enhance the performance of stretch films as the present invention.

An object of the present invention is to provide a method for efficient processing of a polymer by "solid stating" the polymer, after processing, to increase polymer molecular weight and reduce polymer density during heat sealing.

Another object of the present invention is to provide a method for improving the heat sealability of low density polyolefins, such as polyethylene, after the polyethylene has been processed into a film or extrusion coated onto a substrate.

A further object of the invention is to provide a heat seal having an improved seal initiation temperature, hot tack range and hot tack strength.

SUMMARY OF THE INVENTION

The present inventive process improves conventional heat-seals of polyolefin polymers. The polyolefin polymers are processed into a film or coated onto a substrate by conventional means. The film or coated substrate is then exposed to a high energy radiation source prior to formation of the heat-seal. The treated polymers may be processed more easily and efficiently, and provide improved physical properties with improved heat-seal characteristics of the processed polymers.

DETAILED DESCRIPTION OF THE PREFERRED EMBODIMENT

Conventional heat-sealing machinery produces heat-seals graded according to seal initiation temperatures, hot tack ranges and hot tack strengths. The quality of the heat-seal formed depends largely upon the molecular weight of the polymer processed and sealed. The present method improves the heat-seals of polyolefin polymers processed into a film or coated onto a substrate without the use of a curable bonding agent.

Figure 1:
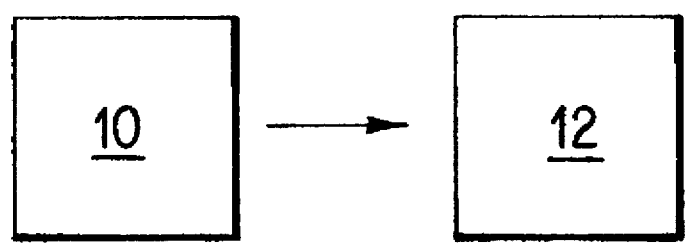
FIG. 1 is a block diagram illustrating the inventive process.
Figure 2:
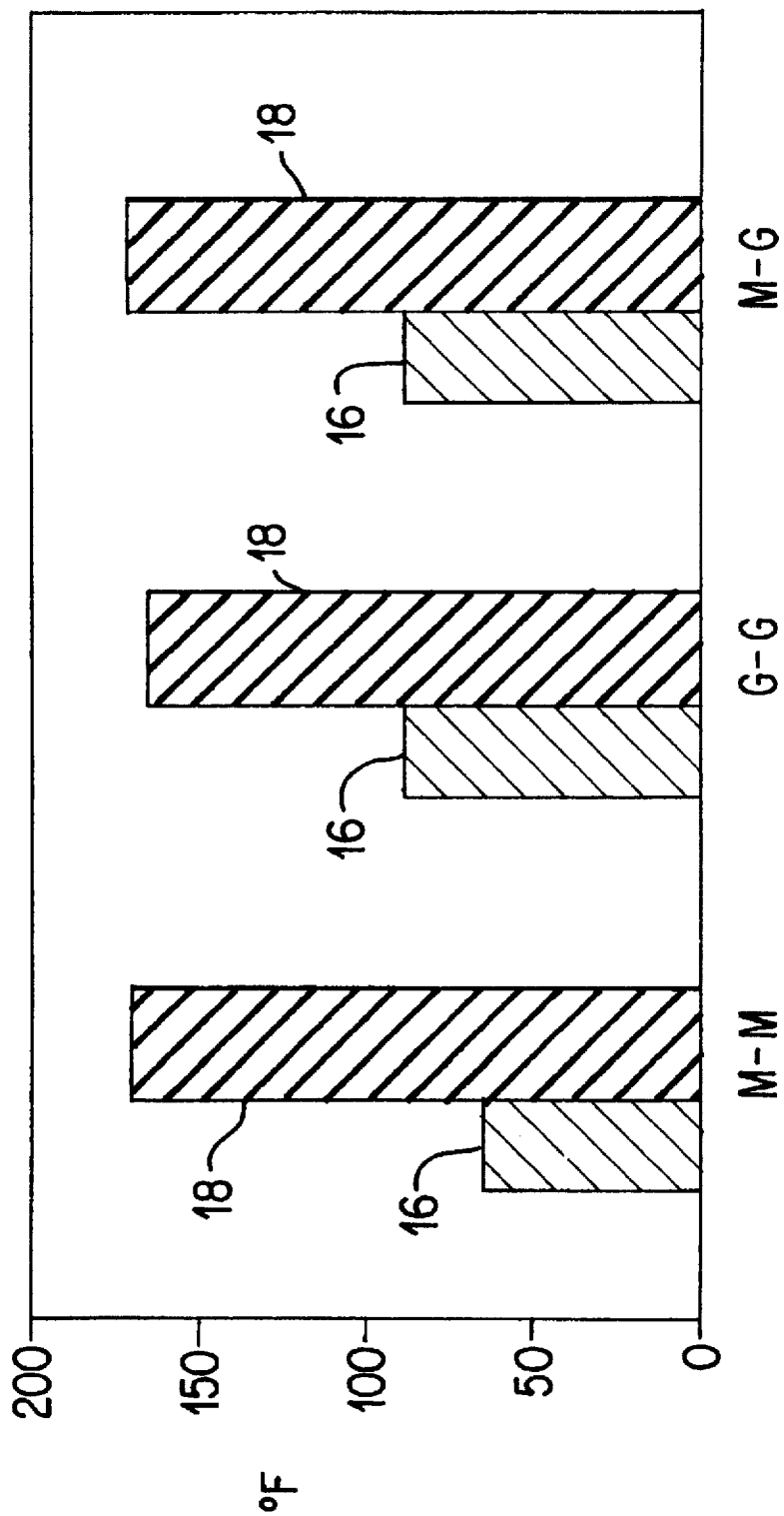
FIG. 2 is a graphical representation of solid state polymer enhancement effect of treatment on heat-seal window temperatures.

Referring to FIG. 1, the method includes coating a paperboard substrate on at least one side 10. The invention should not be limited to a paperboard substrate coated on one side. The invention may be employed on substrates coated on two sides or even embodiments which are more three dimensional, such as dies having multiple faces or multiple planes having common intersection.

The method also includes exposing the polyolefin polymer to a high-energy radiation source 12. The exposure should occur prior to formation of a heat-seal. This high energy radiation exposure provides solid-state crosslinking which results in a significant reduction in the melt index of the polylefin.

The inventive process may employ a high energy source such as gamma radiation or electron beam radiation. The high energy radiation induces crosslinking of the polyolefin, thereby increasing the average molecular weight of the polymer. The degree of crosslinking is controlled by controlling the radiation dosage, type of polyethylene, level of impurities, and levels of crosslinking promoters and inhibitors. The higher energy radiation source may be included as a component of the polymer processing equipment, or as a stand alone process.

The invention affords selection of polyethylene or polyolefins that are easy and efficient to process, and improve the polyethylene or polyolefin heat seal properties after processing without incurring the difficulties associated with processing high molecular weight polyolefin or polyethylene grades. Any polymer capable of forming radiation induced crosslinks can be used. A preferred polymer is a polyolefin having a high or low molecular weight. These polyolefins can include, but are not limited to, low density polyethylene, linear low density polyethylene or blends thereof or ethylene copolymers such as ethylene-acrylic acid, ethylene methacrylic acid, ethylene-acrylate and the like. The polymer may contain crosslinking promoters or inhibitors, if desired. Initial molecular weights of polymers may be varied as necessary.

For demonstrative purposes only, a specific Example of the invention is presented below. The materials, process steps and processing equipment discussed should not be read as a limitation on the invention claimed.

EXAMPLE

Process

One roll of 168 lbs./3000 ft$^2$ liquid packaging paperboard was coated on both sides by a pilot extrusion coater with a low density polyethylene (LDPE, 0.923 g/cc, 4 melt index) resin. The coated material was divided into two coated rolls. One coated roll and the uncoated roll of paperboard where then EB treated using a RadCure line. The EB treatment was applied to the matte side of the coated roll (coated then treated) and the wire side of the uncoated roll. The step of exposing said coating to high energy radiation may also occur during the step of coating the paperboard substrate with the polyolefin polymer. The treatment dosage was 4 mega Rad (MRad) at an acceleration voltage of 250 kilo electron volts (KeV). Four (4) MRad is the maximum end of the dosage range where reasonable paperboard properties are maintained. The remaining coated roll was held as a control (untreated).

These rolls were pilot converted into pint gable-top cartons and side seamed (regular and skived). The finished cartons were subjected to an extensive battery of physical and end-use tests to determine the effects of the treatment.

Results

Physical Properties

Electron-beam treated cartons had slightly lower MD stiffness, comparable edge absorption and edge wicking, lower internal bond, slightly lower tensile strength, and slightly lower brightness, compared to the untreated control board. Tabulated results are shown on Table 1, below. The material involved in this treatment was 2252P which was coated prior to treatment. The first two columns are unskived side seam test samples and the last two are skived side seam samples. In general, EB treatment precipitates a decline in most paperboard properties. This decline is dosage dependent. The 4 MRad dose is high enough to begin to cause noticeable changes in the paperboard properties.

TABLE 1

| | | EB BOARD TREATMENT | | | |
|---|---|---|---|---|---|
| | | UNTREATED REG/REG CONTROL | TREATED REG/REG TRIAL | TREATED SKV/J CONTROL | SKV/J TRIAL |
| Total Caliper, 0.001 in | | 15.9 | 15.9 | | |
| Total Basis Weight lbs/3000 sq. ft. | | 209.2 | 208.9 | | |
| Film Weight lb/3000 sq. ft. | | | | | |
| Average | MS | 25.2 | 24.0 | | |
| Average | GS | 12.6 | 12.2 | | |
| Base Stock Caliper, .001 in (1) | | 13.3 | 13.4 | | |
| Base Stock Wght, lb/3000 sq. ft. (2) | | 171.4 | 172.7 | | |
| Taber V-5 Stiffness, gm-cm | MD | 129. | 132. | | |
| | CD | 55. | 56. | | |
| Edge Absorption grams/100 lin. in. | | | | | |
| 1% Lactic Acid, 40 F.-24 hours | | 0.8 | 0.7 | | |
| 20% Lactic Acid, 100 F.-15 min | | 0.4 | 0.4 | | |
| Water, 73 F.-72 hour | | 2.2 | 2.1 | | |
| Edge Wicking, 1/32 in. | | | | | |
| 20% Lactic Acid 100 F.-15 minutes | GP | 1.0 | 1.0 | | |

TABLE 1-continued

| | | | EB BOARD TREATMENT | | | |
|---|---|---|---|---|---|---|
| | | | UNTREATED REG/REG CONTROL | TREATED REG/REG TRIAL | TREATED SKV/J CONTROL | SKV/J TRIAL |
| | | CP | 1.0 | 1.0 | | |
| | | MP | 1.0 | 1.0 | | |
| Internal Bond, ft lbs/sq in | | MD | 0.148 | 0.132 | | |
| | | CD | 0.135 | 0.132 | | |
| Tensile, lbs/1 in width | DRY | MD | 110.8 | 97.8 | | |
| | | CD | 50.0 | 48.3 | | |
| | WET | MD | 22.6 | 20.6 | | |
| | | CD | 13.0 | 12.0 | | |
| Tensile, wet/dry, % | | MD | 20.4 | 21.1 | | |
| | | CD | 26.0 | 24.8 | | |
| Stretch, % | DRY | MD | 2.6 | 2.2 | | |
| | | CD | 7.1 | 6.8 | | |
| | WET | MD | 3.7 | 3.1 | | |
| | | CD | 11.4 | 10.8 | | |
| | | GS | 81.1 | 77.5 | | |
| PCA Bottom Heat Activated Defects (*) | | | | | | |
| Temperature Normal F. | | | 760. | 760. | 760. | 760. |
| Bottom Score-Cuts | | | 1. | 1. | 1. | 1. |
| Bottom Score Cracks | | | 1. | 1. | 1. | 1. |
| Bottom Score-Pinholes | | | 1. | 1. | 1. | 1. |
| Bottom Panels-Pinholes | | | 2. | 2. | 2. | 2. |
| Temp. Normal + 200 F. | | | 960. | 960. | 960. | 960. |
| Bottom Score-Cuts | | | 1. | 1. | 1. | 1. |
| Bottom Score-Cracks | | | 1. | 1. | 1. | 1. |
| Bottom Score-Pinholes | | | 2. | 1. | 2. | 1. |
| Bottom Panels-Pinholes | | | 2. | 2. | 2. | 2. |
| Bottom Stain (*) | | | | | | |
| Scarlet Moo, Nor. Temp F. | | | 2. | 2. | 3. | 2. |
| Scarlet Moo, Nor. +200 F. | | | 5. | 3. | 5. | 3. |
| 50% Alc-Meth, Nor. Temp. F. | | | 2. | 2. | 2. | 2. |
| 50% Alc-Meth, Nor. Temp. +200 F. | | | 5. | 3. | 5. | 6. |
| Minimum Heat Seal Temperature F. | | | | | | |
| Matte-Matte | | | 215. | 215. | | |
| Gloss-Gloss | | | 210. | 210 | | |
| Matte-Gloss | | | 210. | 210. | | |
| Hot Tack Temperature Degree F. | | | | | | |
| Minimum Matte-Matte | | | 215. | 225. | | |
| Maximum Matte-Matte | | | 280. | 385. | | |
| Minimum Gloss-Gloss | | | 215. | 215. | | |
| Maximum Gloss-Gloss | | | 300. | 375. | | |
| Minimum Matte-Gloss | | | 215. | 220. | | |
| Maximum Matte-Gloss | | | 300. | 380. | | |
| Durability, lks/10 cartons | | | | | | |
| Fill Product, Water | | | | | | |
| Storage temperature, F. | | | 40. | 40. | 40. | 40. |
| Storage Time, Days | | | 1. | 1. | 1. | 1. |
| Shake Time, min | | 60 | 7.1 | 3.3 | 4.8 | 0.2 |
| | | 120 | 16.2 | 9.4 | 11.5 | 4.2 |
| Bottom Sealing - leaks/penetrations per 5 cartons | | | | | | |
| Corner Channel | | | | | | |
| Pres.-Normal Temp. = Norm. −100 F. | | | 0/0 | 0/0 | 0/0 | 0/0 |
| Pres.-Normal Temp. = Normal 760 F. | | | 0/0 | 0/0 | 0/0 | 0/0 |
| Pres.-Normal Temp. = Norm. +100 F. | | | 0/0 | 0/0 | 0/0 | 0/0 |
| total, Corner | | | 0/0 | 0/0 | 0/0 | 0/0 |
| Side Seam Channel | | | | | | |
| Pres.-Normal Temp. = Norm. −100 F. | | | 0/5 | 0/4 | 0/0 | 0/0 |
| Pres.-Normal Temp. = Normal 760 F. | | | 0/0 | 0/0 | 0/0 | 0/0 |
| Pres.-Normal Temp. = Norm. +100 F. | | | 0/0 | 0/0 | 0/0 | 0/0 |
| total, Side Seam | | | 0/5 | 0/4 | 0/0 | 0/0 |
| Gusset Channel | | | | | | |
| Pres.-Normal Temp. = Norm. −100 F. | | | 0/0 | 0/0 | 0/0 | 0/0 |
| Pres.-Normal Temp. = Normal 760 F. | | | 0/0 | 0/0 | 0/0 | 0/0 |

TABLE 1-continued

| | | EB BOARD TREATMENT | | | |
|---|---|---|---|---|---|
| | | UNTREATED REG/REG CONTROL | TREATED REG/REG TRIAL | TREATED SKV/J CONTROL | SKV/J TRIAL |
| Pres.-Normal Temp. = Norm. +100 F. | | 0/0 | 0/0 | 0/0 | 0/0 |
| total, Gusset | | 0/0 | 0/0 | 0/0 | 0/0 |
| Major Flaps Channel | | | | | |
| Pres.-Normal Temp. = Norm. −100 F. | | 0/0 | 0/0 | 0/0 | 0/0 |
| Pres.-Normal Temp. = Normal 760 F. | | 0/0 | 0/0 | 0/0 | 0/0 |
| Pres.-Normal Temp. = Norm. +100 F. | | 0/0 | 0/0 | 0/0 | 0/0 |
| total, Major Flaps | | 0/0 | 0/0 | 0/0 | 0/0 |
| Total Channel Leaks/Penetrations | | 0/5 | 0/4 | 0/0 | 0/0 |
| Top Sealing Channel Leaks/5 ctn | | | | | |
| Temperature | Normal −100 F. | 0. | 0. | 0. | 0. |
| | Normal 750 F. | 0. | 0. | 0. | 0. |
| | Normal +100 F. | 0. | 0. | 0. | 0. |
| Total, Channel | | 0. | 0. | 0. | 0. |
| Side Seam Leaks/5 ctn | | | | | |
| Temperature | Normal −100 F. | 0. | 0. | 0. | 0. |
| | Normal 750 F. | 0. | 0. | 0. | 0. |
| | Normal +100 F. | 0. | 0. | 0. | 0. |
| Total, Side Seam | | 0. | 0. | 0. | 0. |
| Percent Fiber Tear - Outside | | | | | |
| Temperature | Normal −100 F. | 50.0 | 50.0 | 50.0 | 45.0 |
| | Normal 750 F. | 65.0 | 65.0 | 65.0 | 5.0 |
| | Normal +100 F. | 80.0 | 80.0 | 75.0 | 75.0 |
| Average | | 65.0 | 65.0 | 63.3 | 61.7 |
| Percent Fiber Tear - Inside | | | | | |
| Temperature | Normal −100 F. | 75.0 | 70.0 | 75.0 | 60.0 |
| | Normal 750 F. | 95.0 | 85.0 | 90.0 | 80.0 |
| | Normal +100 F. | 95.0 | 85.0 | 95.0 | 90.0 |
| Average | | 88.3 | 80.0 | 86.7 | 76.7 |
| Percent Fiber Tear | | | | | |
| Side Seam Release Top | −1 | 100. | 98. | | |
| | −2 | 100. | 100. | | |
| | −3 | 90. | 100. | | |
| Average | | 97. | 99. | | |

(*) Rated as Follows: 1-Excellent, 2-Good to Excellent, 3-Good, 4-Fair to Good, 5-Fair, 6-Poor to Fair, 7-Poor, 8-Very Poor to Poor, 9-Very Poor
(1) Calculated value based on THEORETICAL coating-weight calipers
(2) Calculated value
(3) Higher number best
(6) Rated as Follows: 1-Excellent, 2-Good, 3-Fair, 4-Poor, 5-Very Poor Carton Sealing Properties The board that was coated and then treated showed significant improvement in bottom stain appearance at elevated sealing temperatures. Tabulated results are shown on Table 1, above. This test is designed to visually rate the degree to which heat causes pinholes and cracks in the polyethylene coating. No significant differences were noted in other carton sealing tests.

Heat-Seal Properties

Figure 3:
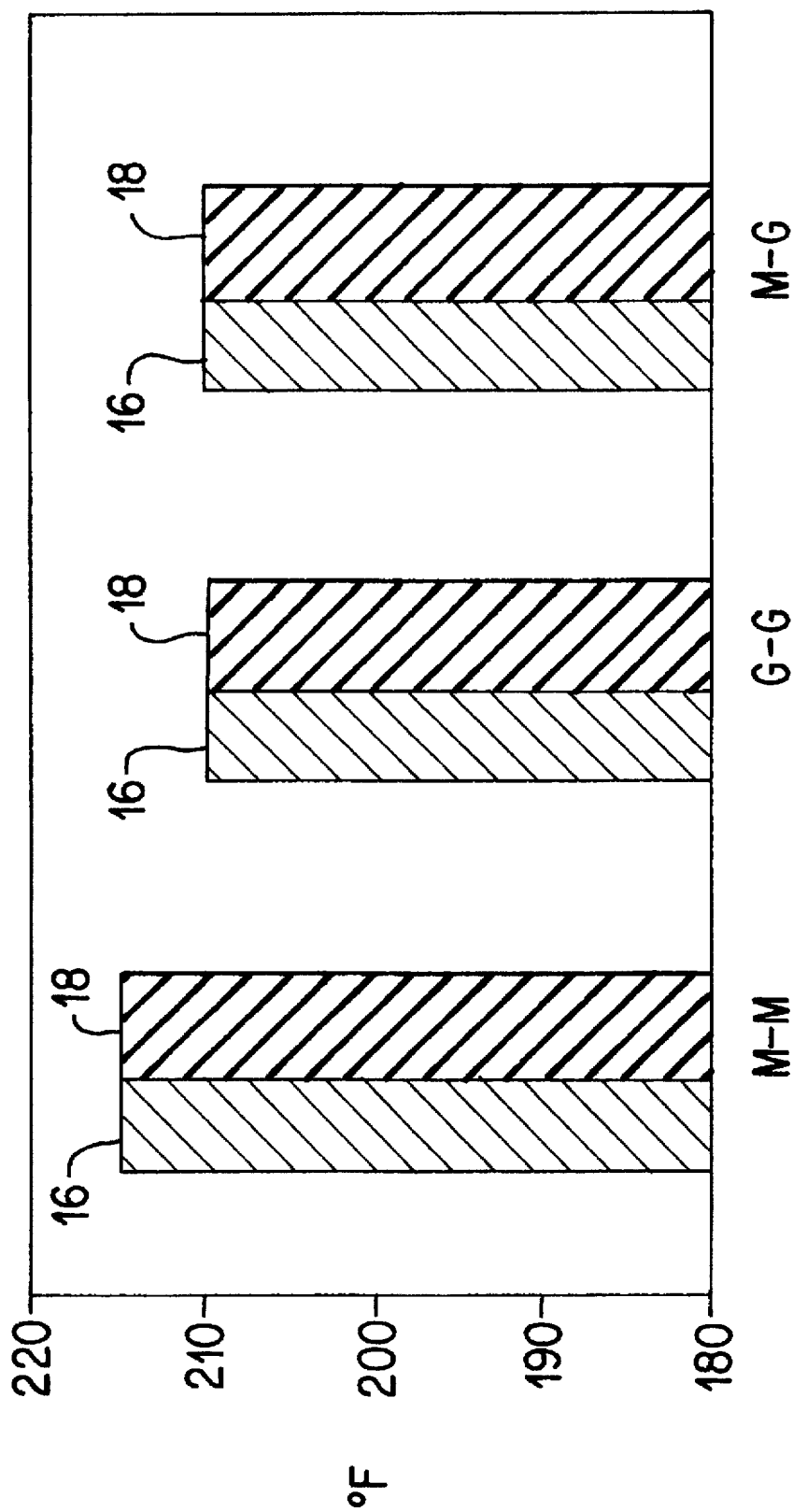
FIG. 3 is a graphical representation of solid state polymer enhancement effect of treatment on minimum heat-seal temperatures.
Figure 4:
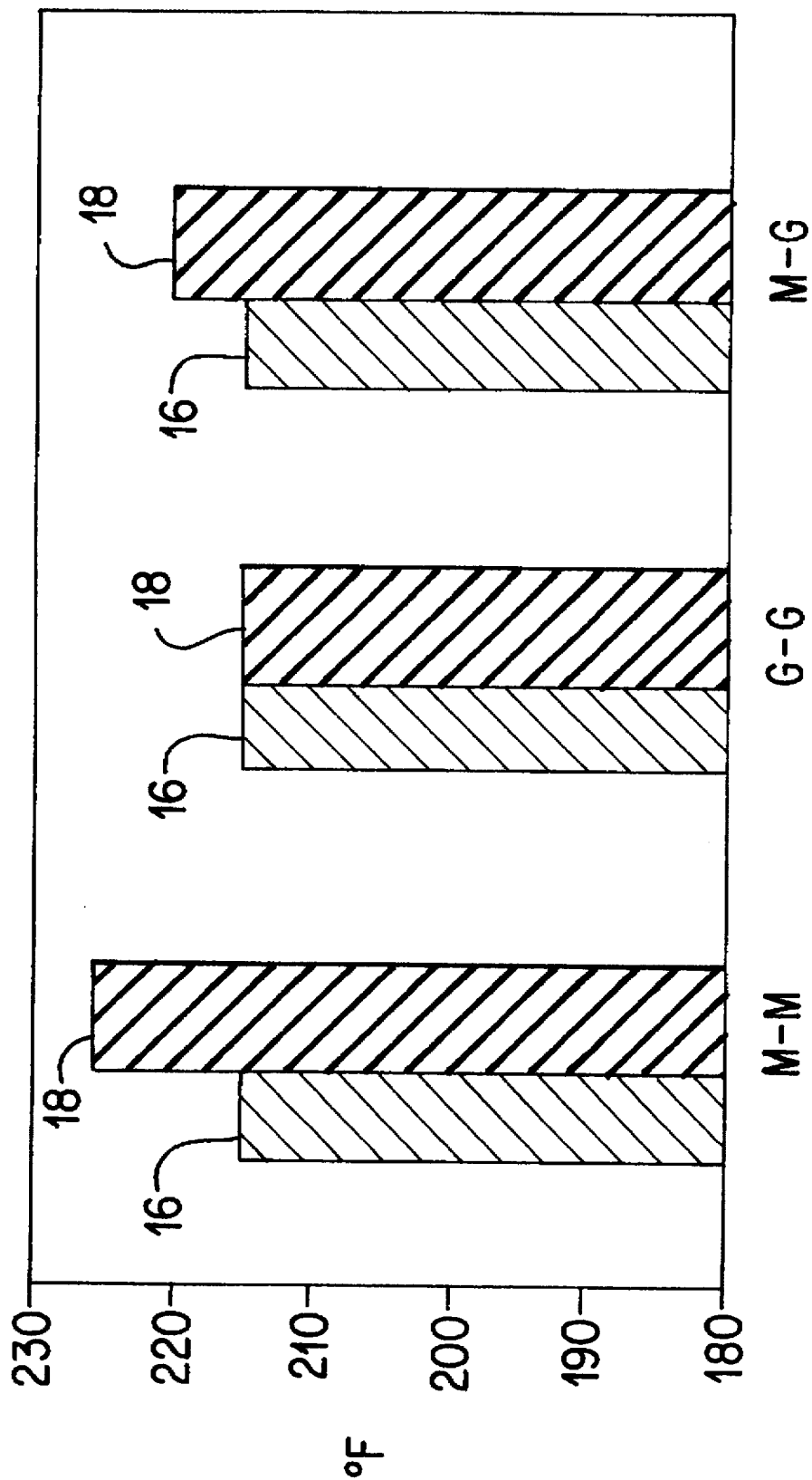
FIG. 4 is a graphical representation of solid state polymer enhancement effect of treatment on minimum hot tack temperatures.
Figure 5:
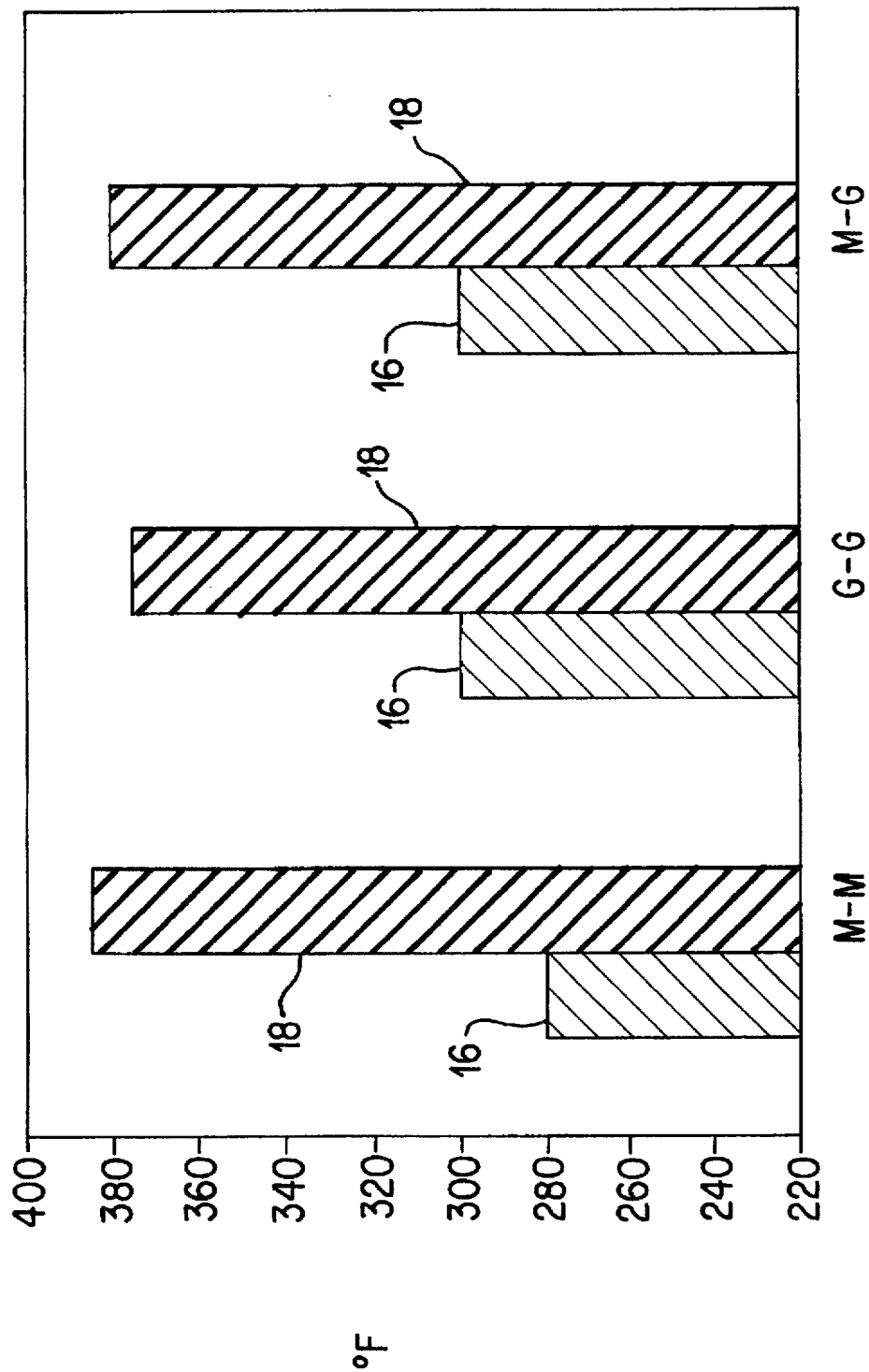
FIG. 5 is a graphical representation of solid state polymer enhancement effect of treatment on maximum hot tack temperatures.

Significant improvements were noted in hot tack and heat-seal window of the carton sample that was treated. The treated carton sample had a much wider heat seal window (maximum hot tack temperature—minimum heat seal temperature) than the untreated cartons. Tabulated results are shown on Table 2, below, and graphically on FIGS. 2 and 5. On FIG. 2, the vertical axis represents the temperature, in Fahrenheit, of the heat-seal window. Along the horizontal axis, three types of seals are displayed: (1) matte, (2) gloss-gloss, and (3) matte-gloss. In each seal grouping, two bars are provided demonstrating the properties exhibited by that type of seal depending on whether the sample was untreated or treated. In FIGS. 2 through 8, the bars representing untreated samples are designated by the numeral 16 and the treated samples are designated by the numeral 18. FIG. 5 graphically shows the maximum hot tack temperature properties exhibited by the different types of seals. Although only the matte side of the boards were treated, the improvements in hot tack and heat-seal window were observed on both the matte and gloss sides of the coated-then-treated cartons. No significant changes in minimum heat seal or minimum hot tack temperatures were noted. Tabulated results are shown on Table 1, above, and graphically on FIGS. 3 and 4. FIG. 3, along the vertical axis, displays the minimum heat-seal temperature in degrees Fahrenheit. Along the horizontal axis, the two bars represent untreated 16 or treated 18 samples, respectively. FIG. 4, along the vertical axis presents the maximum hot tack temperature in degrees Fahrenheit. Along the horizontal axis, again the same groupings of seals and various treatments thereof are shown.

TABLE 2

|  | -EB BOARD TREATMENT- | |
| --- | --- | --- |
|  | REG. 16 OZ. PINT UNTREATED | REG. 16 OZ. PINT TREATED |
| Minimum Heat Seal, Temperature F. | | |
| 20 sec. Retention - Matte-Matte | 215. | 215. |
| Gloss-Gloss | 210. | 210. |
| Matte-Gloss | 210. | 210. |
| Hot Tack Temperature, Degree F. 20 sec. Retention | | |
| Minimum Matte-Matte | 215. | 225. |
| Maximum Matte-Matte | 280. | 385. |
| Minimum Gloss-Gloss | 215. | 215. |
| Maximum Gloss-Gloss | 300. | 375. |
| Minimum Matte-Gloss | 215. | 220. |
| Maximum Matte-Gloss | 300. | 380. |

Durability, Fill Produce: Water

Figure 6:
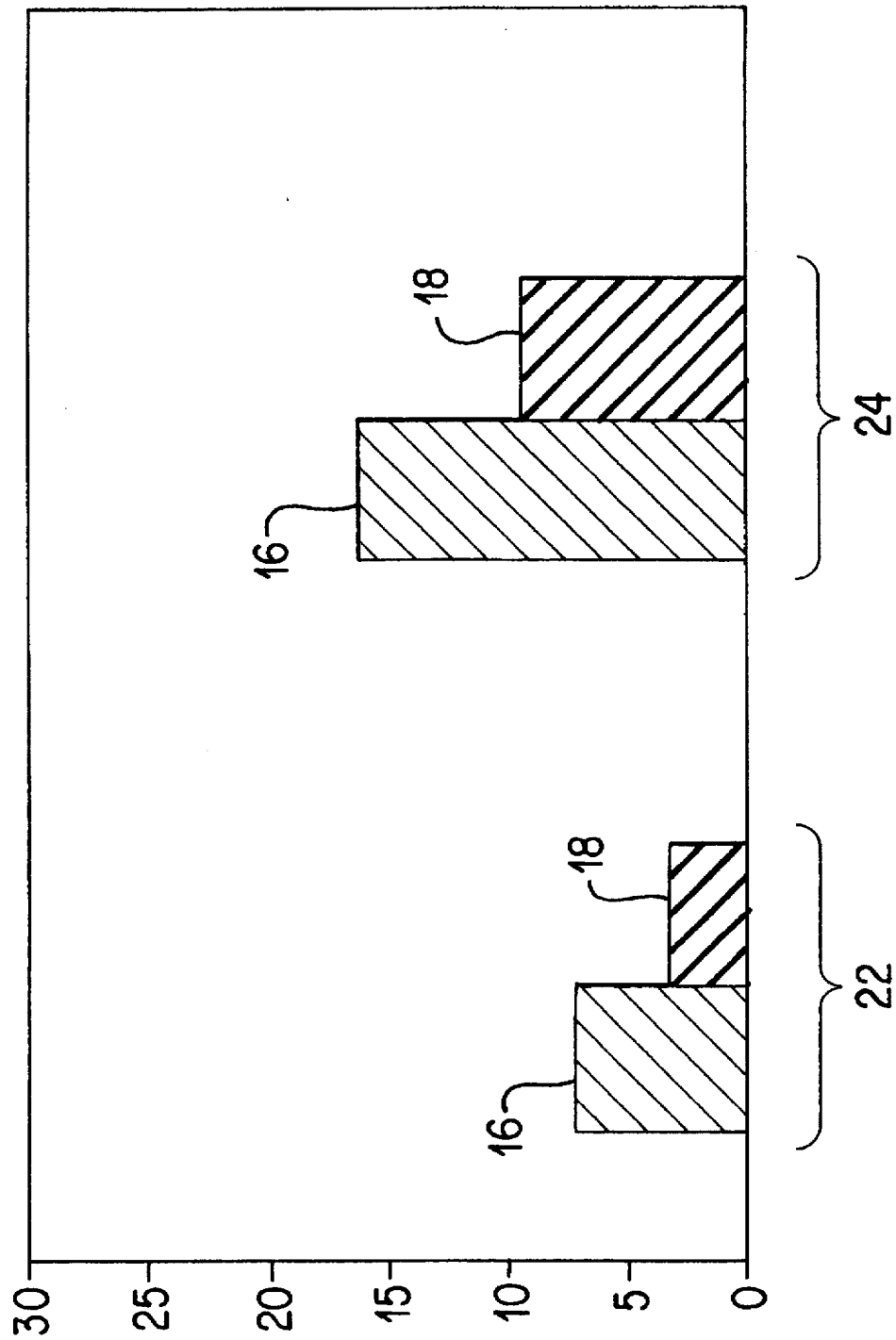
FIG. 6 is a graphical representation of solid state polymer enhancement effect of treatment on the durability of unskived cartons.

The durability or distribution abuse resistance of the treated cartons were markedly improved over untreated cartons for both regular and skived side seam cartons. Tabulated results are shown on Table 1, above, and graphically on FIGS. 6 and 7. FIG. 6 graphically shows, along the vertical axis, the number of leaks per 10 unskived cartons. Along the horizontal axis, a first grouping 22 of products, untreated 16 and treated 18, was shaken for 120 minutes with inspection intervals of 60 and 120 minutes. After 60 minutes, the untreated boards experienced 7.1 leaks per cartons and the treated boards experienced 3.3 leaks per 10 cartons. After 120 minutes the untreated boards experienced 16.2 leaks per 10 cartons and the treated boards experienced 9.4 leaks per 10 cartons.

Figure 7:
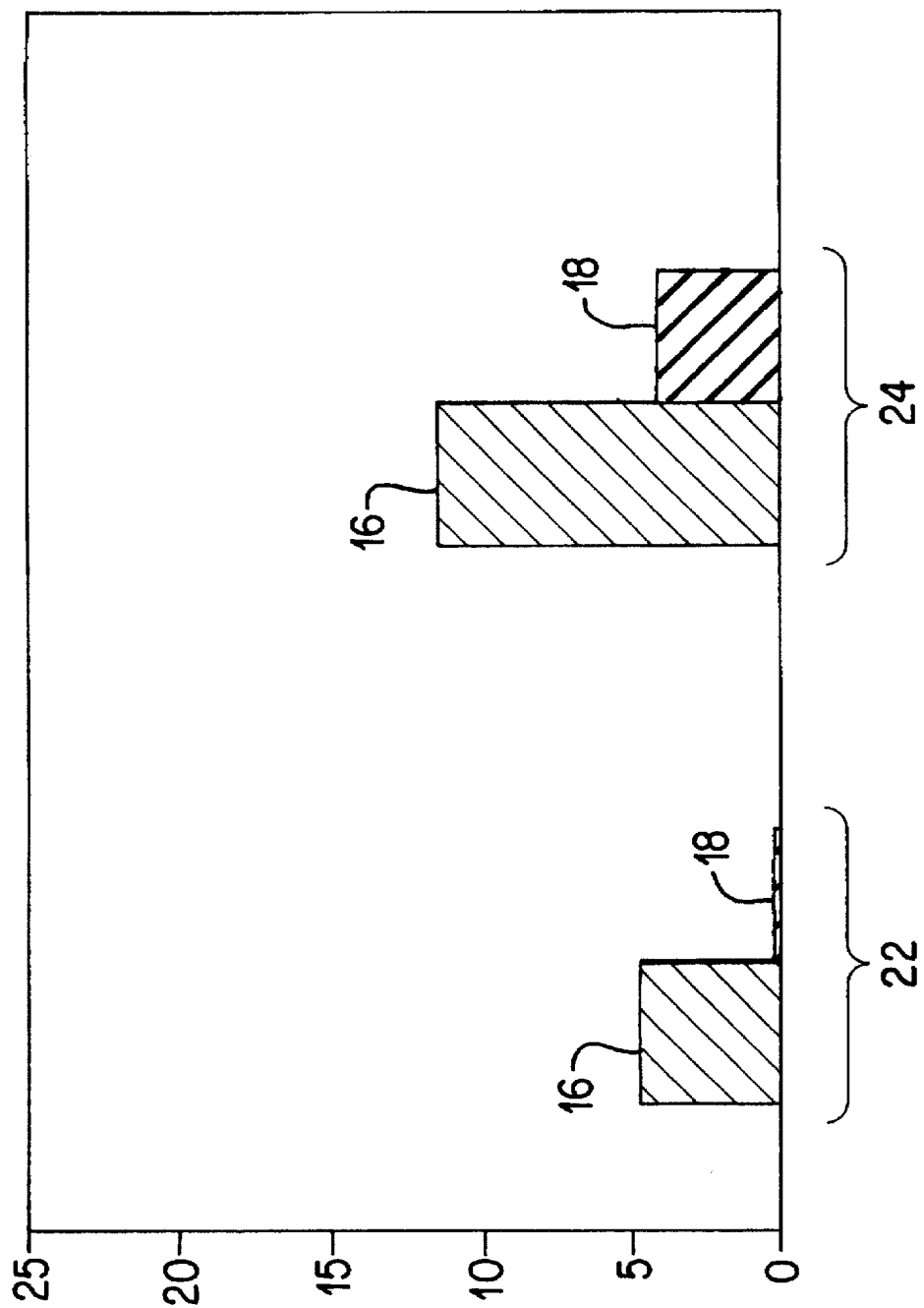
FIG. 7 is a graphical representation of solid state polymer enhancement effect of treatment on the durability of skived cartons.

FIG. 7 is similar graphical representation, except that along the vertical axis the number of leaks per 10 skived cartons is represented. Again, a 60 minute grouping 22 and 120 minute grouping 24 are shown. In the first grouping 22, the untreated boards experienced 4.8 leaks per 10 cartons and the treated boards experienced 0.2 leaks per 10 cartons. In the second grouping 24, the untreated boards experienced 11.5 leaks per 10 cartons and the treated boards experienced 4.2 leaks per 10 cartons. The treated cartons had approximately two to three times fewer leaks after 120 minutes of abuse compared to the untreated cartons.

Polymer Properties

Figure 8:
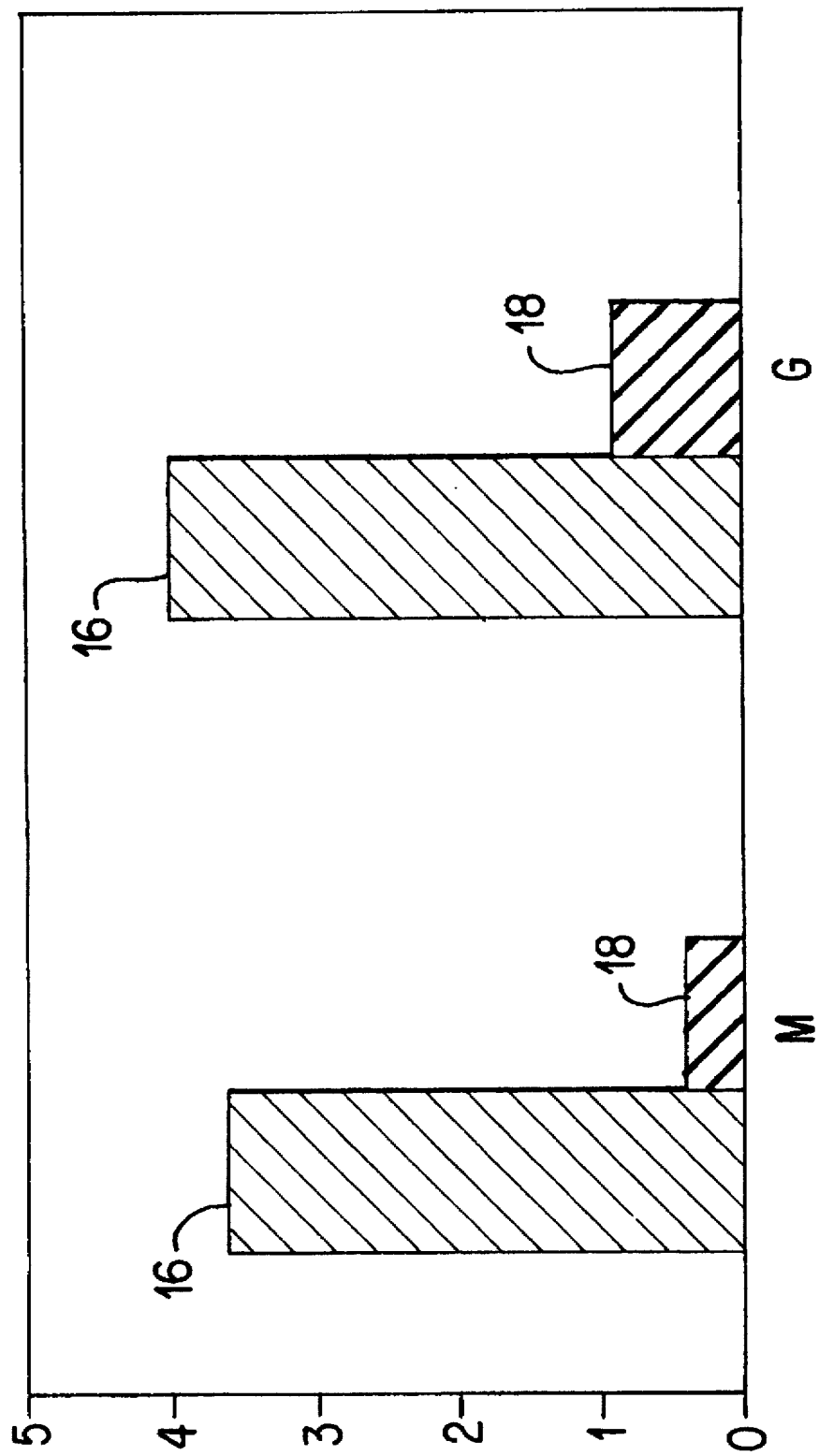
FIG. 8 is a graphical representation of solid state polymer enhancement effect of treatment on melt index.

The melt indices and molecular weight distributions for the coatings on each board sample were determined. The melt indices of the matte and gloss coatings of the treated board were reduced to 0.4 g/10 min. and 0.9 g/10 min. for the matte and gloss coatings respectively. Tabulated results are shown on Table 3, below, and graphically on FIG. 8. In FIG. 8, the vertical axis quantifies the melt index in grams per 10 minutes at 190° C. Two groupings are shown, the matte grouping, indicated by the letter M, and the gloss grouping, indicated by the letter G. Within each grouping, untreated 16 and treated 18, samples are exhibited. The matte treated sample was run at 230° C. because the melt index was too low to determine at 190° C. The starting melt indices (untreated board) were 3.6 g/10 min. and 4 g/10 min. for the matte and gloss coatings respectively. This large drop in melt index indicates that a significant increase in molecular weight has occurred.

TABLE 3

|  | Untreated | Treated |
| --- | --- | --- |
| MATTE | 3.6 | 0.4 |
| GLOSS | 4 | 0.9 |

Conclusions

Electron-beam treatment of polyethylene coated paperboard dramatically improves the heat-seal window and distribution abuse resistance of cartons produced from this board. This improvement is a result of increasing the molecular weight by controlled cross-linking of the polyethylene coating to levels that would be too high to extrusion coat.

Although this invention has been described in terms of preferred embodiments, the claims appended hereto are intended to encompass all embodiments which fall within the spirit of this invention.

I claim:

1. A method for improving the melt index and resultant heat sealability of polyolefin polymers, in a paperboard laminate, for package formation, comprising the steps of:

coating a heat-sealable polyolefin polymer containing no curable bonding agent onto at least one side of a paperboard substrate; and exposing said heat-sealable polyolefin polymer to a dosage of electron beam radiation at a dosage of less than or equal to four mega Rads, wherein said melt index of said heat-sealable polyolefin polymer is lowered to a range of about 0.4 g/10 min to about 0.9 g/10 min.

2. A method as claimed in claim 1, wherein said dosage of electron beam radiation is administered during said step of coating said heat-sealable polyolefin polymer onto at least one side of said paperboard substrate.

3. A method as recited in claim 1, wherein said polyolefin polymer is selected from the group consisting of: a high molecular weight, low density polyethylene; low molecular weight, low density polyethylene; linear, low density polyethylene; and blends thereof.

* * * * *